United States Patent [19]

Percec

[11] Patent Number: 4,701,514

[45] Date of Patent: Oct. 20, 1987

[54] DIFUNCTIONALIZED POLYARYLENE POLYETHERS AND PROCESS FOR PREPARATION THEREOF

[75] Inventor: Virgil Percec, Shaker Heights, Ohio

[73] Assignee: B.F. Goodrich Company, Akron, Ohio

[21] Appl. No.: 814,747

[22] Filed: Dec. 30, 1985

Related U.S. Application Data

[62] Division of Ser. No. 586,678, Mar. 6, 1984, Pat. No. 4,562,243.

[51] Int. Cl.[4] ........................ C08G 65/48; C08G 75/23

[52] U.S. Cl. .................................... 528/174; 528/212; 528/219; 528/373; 528/374; 528/375; 528/376; 525/534

[58] Field of Search ............... 528/174, 212, 219, 373, 528/374, 375, 376; 525/534

[56] References Cited

U.S. PATENT DOCUMENTS 4,562,243 12/1985 Percec ................................ 525/534

*Primary Examiner*—John Kight
*Assistant Examiner*—M. L. Moore
*Attorney, Agent, or Firm*—Alfred D. Lobo

[57] ABSTRACT

Oligomers of polyarylene polyethethers (PAPE) having a mol wt $\overline{Mn}$ in the range from 1000 to about 10,000 are converted to difunctionalized oligomers so as, in the first instance, to provide a reactive double bond (for example, a vinylbenzyl group) at each end of the PAPE; and, in the second instance, to provide a triple bond (benzylethynyl group) at each end of the PAPE. The PAPE most preferably has a repeating unit which is the residuum of two dihydric phenols or thiophenols ("DHP") linked through a C=O, —S—S—, or —$SO_2$-group, or a Si or C atom, and or ether O, or thioether S atoms. The preferred repeating unit is formed by reaction of a DHP such as bisphenol A (BPA) with a halogenated DHP such as dichlorophenyl sulfone (DCPS) so as to provide an alternating configuration. The repeating unit may also include a linking residue of a reactive solvent which residue provides chain extension in the backbone. An oligomer which is a homopolymer having a repeating unit in which at least four benzenoid rings are connected through ether O atoms, may also be difunctionalized. In particular, α,ω-di(phenol)aromatic polyether sulfone oligomers ("APS") are esterified so as to have terminal methacrylyl groups; and, etherified so as to have styryl end groups which are thermally crosslinkable. Illustrated are APS oligomers having BPA-DPS repeating units. The BPA moiety may be replaced with other diphenols. The synthesis of PAPE oligomers with terminal double bonds is carried out with a fast and quantitative modified Williamson etherification of the PAPE with an electrophilic haloalkyl reactant ("HAR") such as chloromethylstyrene ("CIMS") in the presence of a major molar amount (more than 50 mol% based on the number of moles of OH or SH groups originally present in the APS) of a phase transfer catalyst ("PTC") such as tetrabutylammonium hydrogen sulfate ("TBAH"). The vinyl groups at each end of the oligomer may then be converted to ethynyl groups by bromination of the DAPS in $CH_2Cl_2$ or $CHCl_3$, followed by dehydrobromination in the presence of potassium-tertbuoxide (K—t—Bu"). The glass transition temperature ($T_g$) of the di(styrenated)APS after thermal curing is unexpectedly much higher than that of the APS from which it is derived.

23 Claims, No Drawings

DIFUNCTIONALIZED POLYARYLENE POLYETHERS AND PROCESS FOR PREPARATION THEREOF

This is a division of application Ser. No. 586,678 filed Mar. 6, 1984, now U.S. Pat. No. 4,562,243.

BACKGROUND OF THE INVENTION

The elegant demonstration by Milkovich et al that graft copolymers can be prepared by the copolymerization of macromonomers (hereafter "macromers" for brevity), with conventional small monomers has initiated a spate of publications in this field. Particular interest has been focussed upon the radical polymerizations of vinyl monomers because it was expected that the rate of polymerization and the degree of polymerization on the molecular weight ($\overline{Mn}$) of the growing polymer may be substantially the same as that of conventional vinyl monomers. Both the rate and degree of polymerization are generally quite high for vinyl monomers which are therefore of major economic interest. The realization that a large moiety adjacent the vinyl head group often reduces the rate of polymerization of the macromer because of the relatively low molar concentration of reactive end groups, particularly at high conversions where also the increased viscosity of the reaction mass reduces the diffusion of the macromer to the reaction site, has done nothing to dull this interest.

The particular interest of this invention is to tailor a polyarylene polyether ("PAPE") oligomer which was desired to be not only thermally crosslinkable through its terminal vinyl groups, but was preferably also to be capable of withstanding thermal degradation at a temperature in the range from above 100° C. to about 200° C.

This invention is more particularly related to difunctional polymers of dihydroxybenzene, dihydroxynaphthalene, and diphenols, all referred to herein as dihydric phenols ("DHP"), and the corresponding sulfur (thio) compounds referred to as polydihydric thiophenols ("DHTP"), which polymers have a $\overline{Mn}$ (number average mol wt) less than about 10,000, hence termed oligomers. One or the other DHP and DHTP, or both, are referred to herein as "DH(T)P" for brevity. Such oligomers are defined herein as polymers containing from 2 to about 100 repeating units each having the formula $-\!\!\!\!\{$DH(T)P—$R^s\}\!\!\!\!-$, where $R^s$ represents the residue of a linking group. These oligomers contain at least three phenyl or thiophenyl rings which may have inert substituents, each ring linked to another through an O, Si, C or S atom. Such DHP and DHTP oligomers, also, poly[DH(T)P], or $[DH(T)P]_n$, are terminated at each end (hence "di-terminated") with a phenol ("Ph") or thiophenol ("TPh") group respectively, which group may also have inert substituents. For brevity, "di-(T)Ph-terminated" refers herein to either or both oligomers which are Ph- and TPh-terminated respectively.

Most commonly, an anionic living polymer is reacted with electrophiles containing unsaturated functions. For example, polystyrene, polyisoprene, or styrene-isoprene diblock macromers have been terminated with various polyfunctional groups such as alpha-olefin, vinyl alkyl ether, styryl, acrylate, methacrylate, maleic half ester, or epoxy. Macromers have also been synthesized by Tsuruta by a poly-addition reaction of divinyl compounds (Makromol. Chem. 183 29–45, 1981), and by Hudecek by transformation of reactive polymer end groups (Polym. Bull. 3 143, 1980).

Cationic techniques have also been used for preparing macromers by Kennedy et al (1980) who prepared a polyisobutylene macromer, and by Sierra-Vargas (1980) who prepared a polytetrahydrofuran macromer.

Of more particular interest is that it is known that it is possible to use a wide variety of macromers with one polymerizable vinyl head group, each of which macromers may be tailored in $\overline{Mn}$ and structural configuration to provide polymers with a wide spectrum of physical properties. Typical of such macromers are those with styryl and acrylate head groups disclosed by Kennedy, J. P. et al in I.U.P.A.C. *Intl. Symp. on Macromolecules,* Florence, Preprints, p 162 (1980); *Polym. Prepr. Am. Chem. Soc. Div. Polym. Chem.,* 23, No. 2, 99 (1982); *Polym. Bull.,* 6, 135 (1981); inter alia.

In all the foregoing prior art teachings, the macromer was produced in an organic liquid phase in which the reactants were soluble. Styrene has been polymerized and capped with ethylene oxide in a benzene solution, and the polymer in this solution was esterified by reaction with methacryloyl chloride. The mono-terminated material so obtained was a methacrylate-terminated polystyrene macromer which can be polymerized by free radical copolymerization with ethyl acrylate, butyl acrylate, or other suitable monomers. See "Graft Polymers with Macromonomers. I. Synthesis from Methacrylate-Terminated Polystyrene" by Schulz, G. O. and Milkovich, R., *J. Appl. Polym. Sci.,* Vol 27, 4773–86 (1982).

Where the reactants are poorly soluble in commonly available organic solvents, phase transfer catalysis ("PTC") has been used, both in polymer modification (see J M. J. Frechet, Polym. Prepr., 23(1), 139 (1982); and, Y. Imai, J. Macromol. Sci. -Chem., A15, 833 (1981)), and in polymer synthesis (see L. J. Mathias, J. Macromol. Sci. -Chem., A15, 853 (1981); and, F. L. Cook and R. W. Brooker, Polym. Prepr., 23(1), 149 (1982)). In nucleophilic displacement step-growth polymerizations in which PTC syntheses have been used, not only can the need for anhydrous aprotic solvents be obviated but there are also several other advantages. The reaction is very fast, quickly reaching high MW and 100% yield. The polymer weight is relatively independent of the ratio between the nucleophilic and electrophilic reactants. Most importantly, the organic-soluble polymer obtained almost always contains electrophilic species as chain ends, independent of the reaction yield and reactant ratio.

It is known that selected bis(phenols) react with excess chloroethyl vinyl ether ("CEVE") and base in dimethyl sulfoxide ("DMSO") solution; but quite recently, this reaction was more easily accomplished by replacing DMSO with another solvent and employing a PTC, and in particular, 4,4'-isopropylidenediphenol (also, 2,2-bis(4-hydroxyphenyl) propane, or bisphenol A, "BPA") was reacted with CEVE to yield BPA-diethoxy vinyl ether ("DEVE") quickly and in high yield, much greater than 50% (See "Synthesis of Bis(aryloxyethyl) Vinyl Ethers via Phase Transfer-Catalyzed Nucleophilic Displacement in 2-Chloroethyl Vinyl Ether" by R. R. Gallucci and R. C. Going, *J. Org. Chem.,* 1983, 48, 342–346). But BPA-DEVE is not thermally crosslinkable without a cationic catalyst, or free radical catalyst, and has a low glass transition temperature.

In an analogous manner, I have found that a BPA reacts easily with chloromethylstyrene ("ClMS") in the presence of less than about 10 mole percent (mol %), that is, a 0.1 molar equivalent (mol equiv), of a PTC giving excellent yield. The terms "mol %" and "mol equiv" are used herein based on the number of moles of —OH groups in the BPA, or the number of moles of —SH groups in bisthiophenol A ("BTPA"), unless otherwise specified. The acronym "B(T)PA" is used herein to denote either BPA or BTPA. Thus, the option of using a PTC reaction to tailor a BPA bifunctional vinyl-terminated monomer was a second option since the solubility in DMSO, and accomplishing the reaction in the solvent, was not a problem.

Poly(phenylene oxide) ("PPO" for brevity) may be difunctionalized by esterification as is disclosed in "Reactions of Poly(phenylene Oxide)s with Quinones. I. The Quinone-Coupling Reaction Between Low Molecular Weight Poly(2,6-Dimethyl-1,4-phenylene oxide) and 3,3',5,5'-tetramethyl-4,4'-Diphenoquinone", by Dwain M. White, *Jour. of Polym. Sci., Polym. Chem. Ed.*, Vol 19, 1367-1383 (1981).

Unlike prior art syntheses, this invention is directed to different difunctionalized oligomers. These are (A) oligomers of at least one DH(T)P, also referred to as poly[DH(T)P] or $[DH(T)P]_n$, which are formed by a condensation reaction with a reactive linking group resulting in the connection of two DH(T)P moieties with a linking residue $R^s$; such oligomers are soluble in organic solvents, and may be esterified in solution in the presence of base; and, (B) alkali metal salts ("bisphenolates") of at least one of the $R^s$-linked DH(T)P oligomers formed as described, which salts are essentially insoluble at room temperature, or only soluble in the aforementioned solvents at elevated temperatures in the range from about 70° C. to about 150° C., yet may be either esterified or etherified essentially quantitatively. As defined herein, Ph-terminated polyphenylene ("PP") is an oligomer of a dihydricphenol (DHP), namely 1,4-dihydroxybenzene or hydroquinone ("HQ") which may have inert substituents, in which oligomer the backbone includes at least three phenyl rings, one connected to another through an ether O atom; or, PPO oligomers which are $R^s$-linked.

However, it must be kept in mind that a reaction with ClMS, or other reactant with a thermally polymerizable vinyl group, at a relatively higher temperature than room temperature will result in polymerization of the ClMS and the reaction is therefore unsuitable. It is unnecessary to state that difficulty polymerizable reactants will be of little interest for the purposes of this invention.

Though an α,ω-di(vinylbenzyl)BPA oligomer $VB—(BPA)_n—VB$ (the "VB", vinylbenzyl being the residuum of the ClMS, and the BPA representing the residuum of the BPA), is thermally crosslinkable, it is excessively brittle, and of little practical economic interest. It appeared that, if an oligomer with more desirable properties than that of BPA could be tailored to be thermally crosslinkable, it might have an adequately high $T_g$. By dint of an exhaustive search, a likely such oligomer appeared to be a relatively low $\overline{Mn}$ oligomer of a known PAPE oligomer which is analogous to the relatively high $\overline{Mn}$ PAPEs disclosed in U.S. Pat. No. 4,108,837 the disclosure of which is incorporated by reference thereto as if fully set forth herein.

Unfortunately, a reaction with a bisphenolate in solution is difficult because the salt is essentially insoluble at room temperature in commonly available solvents and precipitates. Further, relating to the use of a PTC reaction to functionalize a PAPE under usual base-catalyzed PTC reaction conditions, the precipitated polymer hydrolyzes. This hydrolysis reaction vitiates the benefits sought of an efficient PTC reaction. The problem was to nullify, essentially completely, the damaging side effects of the hydrolysis reaction. The need for a solution to the problem was particularly pressing because, not only is a bisphenolate of a PAPE difficultly soluble in DMSO at room temperature even when the solution is kept anhydrous, but the reaction is also unsatisfactory because of the scatter of products formed with poor yield.

Proof that the hydrolysis problem of a particular PAPE, namely an aromatic polyether sulfone ("APS") oligomer with only one phenol chain end, was solved, was provided in experiments the results of which were published in an article titled "Comb-Like Polymers and Graft Copolymers from Macromers. 1. Synthesis and Characterization of Methacrylate and Styrene Macromers of Aromatic Polyether Sulfones" by Percec, V., Rinaldi, P. L., and Auman, B. C. in *Polymer Bulletin*, 10 215-222 (1983). The styrene-terminated (St-terminated) macromers are thermally polymerizable but give only soluble comb-like or graft copolymers. We also made a APS-MA in which the APS was terminated at only one end with a methacrylyl ("MA") residuum but it was neither thermally crosslinkable, nor solvent-resistant.

I know of no instance where a sodium or potassium salt or other bisphenolate of a di-Ph-terminated DH(T)P oligomer has been prepared which is substantially insoluble in commonly available organic solvents at room temperature, yet has been used to provide a solution in which the reaction occurs so as to undergo a modified Williamson etherification which results in substantially 100% yield of an oligomer having a vinyl, or more specifically a VB head group at both ends of the oligomer. The process of my invention provides for such a reaction with OH-terminated oligomers of a large variety of polyDH(T)P linked through a number of different $R^s$. Among these oligomers are (a) aromatic polyether and polythioether sulfones (all referred to as "APS" for brevity) in which the $R^s$ is a diphenyl sulfone (DPS) residue of a dihalophenyl sulfone (DHPS) linking group; (b) PPO oligomers linked with a diphenoquinone linking group, as disclosed in White, supra; and (c) aromatic polyethers and thioethers in which the $R^s$ is not a sulfone. When the DHP is bisphenol A, and the $R^s$ is DPS, the repeating unit is bisphenol A sulfone ("BPAS"); when the DHTP is bisthiophenol A, the repeating unit is bisthiophenol A sulfone ("BTPAS"), both of which sulfones are together referred to herein as 'bis(thio)phenol A sulfones', and for brevity, "B(T)PAS". As a result, salts of a wide spectrum of DH(T)P oligomers with terminal OH or SH groups may be esterified or etherified to contain terminal reactive vinyl, and more specifically VB groups, which VB-containing oligomers may then be thermally polymerized rapidly to yield solvent-resistant materials.

The difunctional DH(T)P oligomers may also be used as an intermediate for the synthesis of other compounds. For example, the di(styrenated) oligomer may subsequently be converted to an α,ω-di(ethynylbenzyl) PAPE which has terminal triple bonds known to be desirable for the development of thermally curable matrix resins for lightweight composite materials, without the evolution of volatile by products. (See P. M. Hergenrother, *J. Polym. Sci., Polym. Chem. Ed.*, 20, 3131 (1982).

SUMMARY OF THE INVENTION

It has been discovered that a soluble poly[DH(T)P], namely a $[DH(T)P]_n$ oligomer (n=2 to about 100) of at least one DH(T)P monomer in which oligomer each phenyl ring is connected to another through an O, Si, C or S atom, may be esterified so as to yield a difunctionalized oligomer di$[DH(T)P]_n$ with vinyl unsaturation at each of its chain ends, by a reaction in solution ("solution reaction") with a solvent for the reactants in the presence of base, at ambient pressure and a temperature below that at which the functionalized ends will be substantially crosslinked.

It is therefore a general object of this invention to provide a solution reaction in which an OH- or SH-terminated $[DH(T)P]_n$ of at least one DH(T)P monomer may be esterified with an $\alpha,\omega$-unsaturated haloacyl reactant ("HAR") so as to have vinyl-terminated chain ends.

It has also has been discovered that a soluble PAPE oligomer having a repeating unit in which a DH(T)P is linked through a linking residue $R^s$, defined hereinafter, may be difunctionalized in solution. However, an insoluble bisphenolate of the PAPE oligomer can only be difunctionalized in a PTC reaction described in detail hereafter.

It has further been discovered that a $[DH(T)P]_n$ oligomer of one or more DH(T)P monomers may be converted to a bisphenolate salt, preferably in situ, which salt in the presence of an effective amount of PTC sufficient to solubilize the salt in the organic phase and essentially to negate hydrolysis of the oligomer, may be (a) esterified with the HAR, or, (b) be etherified with a haloalkyl-$\alpha,\beta$-olefinically unsaturated reactant, also referred to herein as "HAR". For example, an aromatic polyether sulfone (APS) oligomer may either be esterified or etherified by means of a PTC reaction.

It is therefore also a general object of this invention to provide a PTC condensation reaction which is a simple, highly efficient modified Williamson etherification yielding telechelic oligomers containing vinylbenzylic ("VB") chain ends. These VB-terminated oligomers are useful for the preparation of thermally crosslinkable PAPE networks, and more specifically, APS networks, resulting in materials which are essentially insoluble in commonly available organic solvents, and also in aggressive solvents like DMSO, dimethyl formamide ("DMF") and tetrahydrofuran ("THF").

It is another specific object of this invention to provide a PTC synthesis for the etherification or the esterification of a B(T)PAS oligomer consisting essentially of alternating residua of diphenyl sulfone ("DPS") units and BPA or BTPA units respectively, each or all of which units may have inert substituents. These oligomers may thus be difunctionalized with a HAR so as to include reactive end groups with vinyl, and thereafter, ethynyl unsaturation.

It is also a specific object of this invention to provide a difunctionalized APS (or "di-APS") oligomer having a BPA-DPS repeating unit, or a BTPA-DPS repeating unit, optionally with plural linking residues $R^s$, by a process comprising, etherifying a salt of the APS with a haloalkyl-vinyl aromatic compound, or esterifying the salt with a (meth)acryloyl halide, or other monomeric moiety with a reactive leaving group, essentially quantitatively, in the presence of an effective amount of a PTC so as to yield a functional head at each end of the oligomer.

It is still another specific object of this invention to provide a substantially linear thermoplastic, relatively low $\overline{Mn}$ $[DH(T)P]_n$ of at least one $R^s$-linked DH(T)P monomer with a styrene head group at each end, in substantially 100% yield, by a PTC reaction which yields an oligomer of predetermined $\overline{Mn}$. This $R^s$-linked $[DH(T)P]_n$ which is di-styrenated ("St-terminated") is a telechelic polymer characterized by an unexpectedly high rate of thermal crosslinking which rate is much higher than that of known thermally crosslinkable oligomers. Di(styrenated)$[DH(T)P]_n$, for example, distyrenatedAPS, quite unexpectedly, has a lower $T_g$ than that of the Ph- or TPh-terminated $[DH(T)P]_n$ from which it was derived, which makes for easier processing, at the same time providing a bigger processing window. By 'processing window' I refer to the range over which the polymer may be processed without curing prior to start of the exotherm. Crosslinked di-$[DH(T)P]_n$ and di-APS with VB chain ends are solvent resistant and have a surprisingly high $T_g$ in the range from about 100° C. to about 200° C., which is much higher than that of a non-distyrenated oligomer, or a mono-styrenated $[DH(T)P]_n$ or APS macromer. The di-$[DH(T)P]_n$ or APS allows one to start with a relatively low mol wt oligomer which upon crosslinking results in a material which has the same or better physical properties than those obtained with conventional commercially available polymers which have mol wts higher than 10,000.

It is a further specific object of this invention to provide a PTC process comprising reacting a salt of an $[DH(T)P]_n$ or APS and ClMS in the presence of at least a 0.5 mol equiv (50 mol %) of an onium salt or other PTC so as to obtain etherification of the $[DH(T)P]_n$, or APS, substantially without hydrolysis thereof, as is evidenced by an essentially 100% yield, and, in a surprisingly short period of time.

It has still further been discovered that a distyrenated $[DH(T)P]_n$ or APS, obtained as described hereinabove, may be converted to an $\alpha,\omega$-di(ethynylphenyl)$[DH(T)P]_n$ in two main steps.

It is therefore yet another specific object of this invention to convert a di(styrenated)$[DH(T)P]_n$ or di(-styrenated)APS into an $\alpha,\omega$-di(ethynylphenyl)$[DH(T)P]_n$ or an $\alpha,\omega$-di(ethynylphenyl)(APS) respectively, in a process comprising, brominating the vinyl end groups of the styrene residues, followed by dehydrobromination in the presence of potassium-tert-butoxide ("K-t-Bu").

DETAILED DESCRIPTION OF PREFERRED EMBODIMENTS

Functional polyaromatics containing either pendant or terminal groups which undergo thermally initiated crosslinking reactions have received much attention recently. There are only a few reactive groups which provide crosslinking reactions without the evolution of volatile by-products. Nadimide, acetylenic, and biphenylenic are among the functional groups most frequently employed for the preparation of thermally crosslinkable oligomers. My invention is particularly directed, in its broad application, to the preparation of a difunctionalized substantially linear crosslinkable thermoplastic polyarylene polyether oligomer, or polyarylene polythioether oligomer (PAPE) represented by the formula:

$$R^e—R—[\text{"PAPE"}]—R—R^e \quad (I)$$

wherein,

R represents O or S in an ester or ether linkage with $R^e$;

$R^e$ represents a residuum containing a terminal carbon to carbon double bond at each end of the PAPE oligomer; and, "PAPE" represents the residuum of the PAPE oligomer.

In its more preferred embodiment, the difunctionalized oligomer is represented by the formula:

$R^e$—R—["DH(T)P"]$_n$—R—$R^e$ (II)

wherein, n is an integer in the range from 2 to 100;

R, and $R^e$ have the same connotation as hereinbefore; and,

["DH(T)P"] is the residuum of dihydric phenol or dihydric thiophenol moieties linked through a linking residue $R^s$ so as to form a repeating unit

[DH(T)P—$R^s$] (III)

and, $R^s$ represents the residuum of a reactive linking group selected from the group consisting of the same or another [DH(T)P]; a dihaloalkane having from 1 to about 18 carbon atoms, more preferably an α,ω-dihalo-lower alkane such as dichloromethane; phosgene; alkyl diacid halides such as adipoyl chloride; aryl diacid halides such as terephthaloyl chloride; dihalophenyl phosphonate* ("DCPP"); dihaloaryl having six ring carbon atoms, such as dibromoxylene; bis(haloalkoxy)alkanes such as bis(chloromethoxy)butane ("BCMB"); and, dihalocycloalkanes having from 3 to 7 ring carbon atoms such as bis(chloromethyl)cyclohexane. More than one DH(T)P and more than one $R^s$ may be present in an oligomer.

*phenyl dichlorophosphine oxide

Preferred ["DH(T)P"]$_n$ are oligomers formed from one or more dihydric phenols or thiophenols having a structure selected from

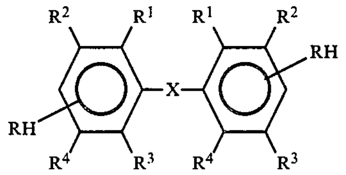

(IV)

and

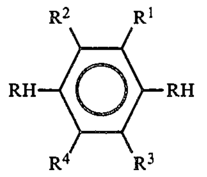

(V)

wherein,

R represents O or S;

X represents a bond between aromatic carbon atoms or a divalent connecting radical selected from the group consisting of C=O, —O—, —S—, —S—S—, —$SO_2$—,

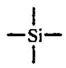

and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups; and, $R^1$, $R^2$, $R^3$, and $R^4$ referred to herein as inert substituents may, if present, each be the same or different and represent halogen, particularly chlorine or bromine; $NO_2$; alkyl having from 1 to about 18 carbon atoms, without regard for the spatial configuration such as normal, iso or tertiary; alkoxy having from 1 to about 18 carbon atoms; and, hydrogen.

As written in the structural formulae, it will be evident that a polynuclear phenol will have an RH on each phenyl ring, while mononuclear phenols have both RH on the ring, most preferably para- to each other, such substituents as may be present occupying one or more other positions on the ring.

When $R^s$ is a DH(T)P it is present in the backbone in an alternating configuration with the other DH(T)P. Reaction between the DH(T)P and the $R^s$ (also a DH(T)P) is effected with an electron withdrawing group as an activator to facilitate reaction between the two DH(T)Ps. For example, when one is BPA and the other (the $R^s$) is DCPS, the $SO_2$ group is the activator, and the terminal Cl atoms react with the H of the BPA to provide an oligomer with the alternating configuration. The identity of the activator group is not critical as long as it is inert in the reaction coupling the DHPs in the alternating configuration. Thus it will now be evident that when either of the DH(T)Ps is a diphenol linked with a weak activator group such as —O—, —S—, —S—S— or —Si—, then the other DH(T)P should be a diphenol linked with a strong activator group such as —CO— or —$SO_2$— to provide the alternating configuration. Most preferred are the strong activating groups such as the sulfone which bonds two halogen substituted benzenoid nuclei as in the 4,4'-dichlorodiphenyl sulfone and 4,4'-difluorodiphenyl sulfone, although such other strong withdrawing groups as hereinbefore mentioned may also be used with ease.

The alkyl substituents may be cyclic or acyclic, including alkyl-substituted cyclic, as long as the total carbon content conforms to the defined amount, and the same is true for alkoxy groups, provided all substituents are inert under reaction conditions. The inert substituents may be the same or different, though it will be apparent that some substituents will be easier than others for steric and other reasons.

Thus, it is seen that the particular structure of the dihydric phenol moiety is not narrowly critical. However, as would be expected, this moiety or residuum in the polymer chain can alter or vary the properties of the resultant polymer produced. Similarly, the reaction rate, optimum reaction temperature and like variables in the process can be varied by the selection of the particular dihydric phenol so as to give any desired change in rate, temperature, physical properties of the polymer and like changes.

It is also contemplated in this invention to use a mixture of two or more different dihydric phenols to accomplish the same ends as above. Thus when referred to above, the [DH(T)P] residuum in the polymer structure can actually be the same or different aromatic residue.

As herein used the DH(T)P term defined as being the "residuum of the dihydric phenol" of course refers to the residue of the dihydric phenol after the removal of the two H atoms from the two aromatic hydroxyl groups. Thus as is readily seen these polyarylene polyethers contain recurring groups of the residuum of the dihydric phenol and the residuum of the reactive linking group, if such is present, or the residuum of another DH(T)P, bonded through aromatic ether oxygen or thioether atoms.

It is preferred that two DH(T)P compounds be used, the first of which is a bisphenol type of compound, and the other a dihalobenzenoid compound which has the two halogens bonded to benzene rings having an electron withdrawing group in at least one of the positions ortho and para to the halogen group. The dihalobenzenoid compound can be either mononuclear where the halogens are attached to the same benzenoid ring, or polynuclear where they are attached in different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness.

More preferred are dihydric polynuclear phenols of the following four types including the derivatives thereof which are substituted with inert substituents:

(VI)

(a) 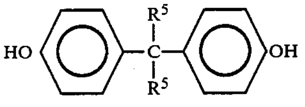

Bisphenol (VII)

(b) 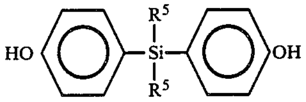

2,2-bis(4-hydroxyphenyl)silane
("BPS")

in which $R^5$ represents hydrogen, lower alkyl having from 1 to about 5 carbon atoms, phenyl and the halogen substituents thereof, and $R^5$ may each be the same or different.

(VIII)

(c) 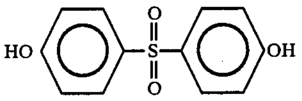

Diphenyl sulfone
("DPS")

-continued (IX)

(d) 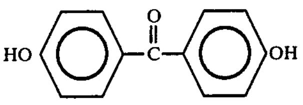

Diphenyl ketone
("DPK")

(X)

(e) 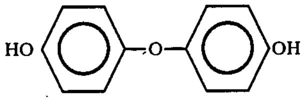

Diphenyl ether
("DPE")

Most preferred are PAPE oligomers in which $R^s$ is a terminally halogenated DHP and the other DH(T)P is also a DHP, there being no additional $R^s$ present. Such oligomers are exemplified by alternating configurations of VI and VIII; VI and IX; VI and X; VIII and X; VII and IX; and IX and X, which oligomers are then difunctionalized by the process of this invention to yield difunctionalized poly[dihydric phenols] ("di-$[DHP]_n$" for brevity).

Examples of the particular foregoing polynuclear phenols, and others referred to by the structure (IV) are given in U.S. Pat. No. 4,108,837 the disclosure of which is incorporated by reference thereto as if fully set forth herein.

This new class of reactive oligomers undergoes fast curing, and VB-terminated APS oligomers in particular, yield thermally cured PAPE networks with $T_g$ values equal to or higher than those of conventional high mol wt PAPE materials.

A conventional esterification of a di-(T)Ph-terminated $[DH(T)P]_n$ oligomer proceeds in solution so as to be esterified with an $\alpha,\omega$-unsaturated haloacyl reactant. The vinyl-containing reactant is referred to herein as "HAR". The [DH(T)P] oligomer consists essentially of repeating units each of which consists of $R^s$-linked DH(T)P residua as defined hereinabove.

A conventional Williamson etherification takes place in the organic phase which is often provided by a reactant, or typically in an aggressive solvent such as THF or DMSO. This is of particular interest because preferred Ph- or TPh-terminated $[DH(T)P]_n$ are those in which $R^s$ is also the dihydric phenol [DHP] residuum, namely a diphenyl sulfone (DPS) residue of a DHPS; and the other DHP is BPA or a substituted 1,4-dihydroxybenzene (HQ). The oligomer formed is represented by the formula $$R^e\text{—O—BPA}\text{+O—DPS—BPA+}_n\text{—O—}R^e$$

wherein BPA and DPS represent the residua of BPA and DHPS. The DHPS may be represented by the structure (XI)

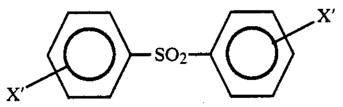

wherein the ring may have inert substituents and X' is selected from fluorine, chlorine, bromine and iodine.

The etherification will proceed only if the bisphenolate of the oligomer is soluble in the organic solvent used. In DMSO at elevated temperature, the etherification proceeds slowly with generally poor yields less than 50%. Thus, a conventional Williamson etherification is inapposite in the framework of a commercially practical process.

In the particular example of a specific APS, namely an oligomer of BPA and 4,4'-dichlorodiphenyl sulfone ("DCPS") which is $R^s$, or of BTPA and DCPS, the oligomer is formed by reaction of an alkali metal salt of the BPA, or BTPA preferably the potassium or sodium salt, and DCPS in anhydrous DMSO. The chain length of the APS oligomer formed is controlled by the relative ratio of BPA or BTPA and DCPS, a relatively lower $\overline{Mn}$ being obtained with a molar excess of BPA or BTPA; the larger the excess, the lower the $\overline{Mn}$.

As will immediately be realized, chain growth is propagated at active sites which are terminated with the alkali metal and the salt of the growing polymer remains soluble in the DMSO though the solution may need to be warmed in the range from about 30° to about 100° C.

Since the APS oligomer is in solution, it appeared that difunctionalizing the APS with a preselected HAR which is also soluble in DMSO, would be easy and efficient. It is not. There is less than 50% yield upon etherification of the APS oligomer though the reaction mixture with a HAR, for example ClMS, is heated to 100° C., largely because the ClMS polymerizes and yields a mixture of unwanted compounds. The poor reactivity and yield of an APS oligomer with an HAR appears not to depend upon the choice of either the APS oligomer or the HAR, except that APS oligomers with higher $\overline{Mn}$ give even poorer yields than lower $\overline{Mn}$ oligomers. Esterification in solution proceeds more easily, but is far from substantially quantitative. These surprising facts created the problem of how effectively to functionalize a Ph-terminated or TPh-terminated PAPE, and most particularly, a Ph- or TPh-terminated $[DH(T)P]_n$. It is this problem which is solved in the most preferred embodiment of this invention.

The $[DH(T)P]_n$ with ester chain ends may also be formed by a conventional base-catalyzed esterification in a solvent for the $[DH(T)P]_n$ and the HAR but the reaction also proceeds only slowly. This is especially so at ambient pressure and temperature below that at which polymerization of the HAR, or polymerization of the di-$[DH(T)P]_n$, and other side reactions give rise to unusable byproducts.

Though DMF and THF are acceptable solvents for some reactants, most preferred are sulfoxide and sulfone solvents having the formula $$R'-S(O)_z-R' \qquad (XII)$$

wherein R' represents a monovalent hydrocarbon group free of aliphatic unsaturation on the alpha carbon atom, and preferably contains less than about 8 carbon atoms or when connected together represents a divalent alkylene group with z being an integer from 1 to 2 inclusive. Thus, in all the most preferred solvents, each oxygen and two carbon atoms are bonded directly to the sulfur atom. R' is more preferably lower alkyl having from 1 to about 4 carbon atoms, phenyl, alkyl phenyl, as well as those where the R' groups are interconnected as in a divalent alkylene bridge as in thiophenes and dioxides.

The major difference between my synthesis and a conventional PTC Williamson etherification such as is disclosed by H. H. Freedman and R. A. Dubois in *Tetrahedron Lett.*, 38, 325 (1975), is the use of at least a 0.5 mol equiv, and preferably a stoichiometric (one mol equiv) amount of PTC. Under these conditions, both the nucelophilic and electrophilic groups are present in the organic phase, thus allowing etherification to take place in solution. The reaction is very fast at room temperature, and the reaction course can be followed by disappearance of the green color of the phenolate anion. 200-MHz $^1$H-NMR and FT-IR spectra confirm that essentially quantitative etherification of the $[DH(T)P]_n$ chain ends is obtained.

I have now found that a $[DH(T)P]_n$ may be difunctionalized most effectively, that is, terminated at each end with the residuum of any HAR reactive monomer which has a terminal electrophilic haloalkyl group at one end, and a vinyl group at the other, provided it is done under the PTC reaction conditions which essentially negate hydrolysis of the $[DH(T)P]_n$ and increases the reactivity of the phenolate chain ends. This is because the onium phenolate is dissolved in a non-polar solvent which does not solvate the onium anions.

Common HAR monomers are haloalkyl vinyl ethers having from 3 to about 20 carbon atoms, haloalkyl vinyl aromatic compounds having from 9 to about 30 carbon atoms, isophthaloyl and terephthaloyl chloride, acryloyl chloride and methacryloyl chloride, together referred to herein as (meth)acryloyl chloride, terminally monohalogenated $\alpha,\beta$-unsaturated olefins having from 4 to about 18 carbon atoms and the like. Also, HAR oligomers are selected from oligomers having a $\overline{Mn}$ less than about 10,000 and preferably less than about 5,000, a terminal haloalkyl group, and a vinyl group at the other end.

Though VB end groups are most preferred, any HAR with a comparably reactive halogen atom at one end and a vinyl group at the other, will provide excellent reaction rates and yields. Similarly, though methacryloyl chloride is the most preferred HAR for esterification, numerous available terminally monohalogenated $\alpha,\beta$-unsaturated olefins may be used, most preferably if they include an allylic halide group. For example, 1-chloro-2-hexene is an HAR with desirable allylic halide characteristics. Also useful, but providing a slower reaction rate is 6-chloro-1-hexene, which is not an allylic halide.

In the specific instance where the DHP is BPA, and the $R^5$ is DCPS, the difunctionalized oligomer has a backbone which includes a repeating unit [DPS—BPA], it being evident that when either moiety in the repeating unit is substituted with inert substituents, the repeating unit will be represented by [DPS(s)—BPA(s)] where (s) represents H or $R^1$, $R^2$, $R^3$ or $R^4$. Analogously, when the DHTP is BTPA, the repeating unit will be represented by [DPS(s)—BTPA(s)].

Though it is evident that the DH(T)P must always be a dihydric(thio)phenol, that is, have a single OH or SH group on each phenyl ring, it is not essential that the OH or SH group be at the 4-position, though this is the most convenient.

The physical and chemical properties of the di-[DH(T)P] oligomer formed may be tailored by the choice of the substituted (or not) DHP or DHTP or $R^s$ used. Alkylation, alkoxylation or halogenation of BPA or BTPA or HQ yields a mixture of substituted products, alkylated products being most preferred among which the ortho-substituted BTA or BTPA predominates.

When the [BPA—DPS] oligomer is to be esterified so that $R^e$ includes a methacrylyl end group, R being O and connected to $R^e$ with an ester linkage in the formula (II) at each end, the di-esterified oligomer is represented by the formula:

$$H_2C{=}C(CH_3){-}CO{-}O{-}BPA{+}O{-}DPS{-}O{-}BPA{+}_n{-}O{-}CO{-}C(CH_3){=}CH_2$$

wherein n is an integer in the range from 2 to about 20.

Analogously, esters of oligomers with the following repeating units are esterified:

| | | |
|---|---|---|
| [DPS—DCPP]; | [BPA—DPK]; | [BPS—DPK]; |
| [DPE—DPS]; | [DPK—DPS]; | [BPS—DPS]; |
| [DPS—HQ]; | [BPA—DCPP]; | [BPA—BCMB]; |
| [BPA—CO—HQ]; | [BPA—$CH_2$—HQ]; | [BPA—DPS—HQ]; |
| [BPA—DPS—BPS]; | [BPA—DPS—DPK]; | [BPA—DPS—DPE]; |

[PPO] wherein the monomer is 2,6—dimethyl phenol; [BPA—$CH_2$—Ph—$CH_2$—BPA] wherein Ph represents a phenyl ring; and, [BPA—$CH_2$—Ph—$CH_2$—HQ].

When the [BPA—DPS] oligomer is to be etherified, for example di-styrenated so as to include a vinylbenzyl (VB) group at each end, the di-styrenated APS is represented by the formula:

$$St{-}CH_2{-}O{-}BPA{-}O{+}DPS{-}O{-}BPA{+}_nO{-}CH_2{-}St$$

wherein "St" represents a styryl group and n is an integer in the range from 2 to about 20.

Analogously, ethers of oligomers with the following repeating units are etherified:

| | | |
|---|---|---|
| [DPS—DCPP]; | [BPA—DPK]; | [BPS—DPK]; |
| [DPE—DPS]; | [DPK—DPS]; | [BPS—DPS]; |
| [DPS—HQ]; | [BPA—DCPP]; | [BPA—BCMB]; |
| [BPA—CO—HQ]; | [BPA—$CH_2$—HQ]; | [BPA—DPS—HQ]; |
| [BPA—DPS—BPS]; | [BPA—DPS—DPK]; | [BPA—DPS—DPE]; |

[PPO] wherein the monomer is 2,6—dimethyl phenol; [BPA—$CH_2$—Ph—$CH_2$—BPA] wherein Ph represents a phenyl ring; and, [BPA—$CH_2$—Ph—$CH_2$—HQ].

The difunctionized oligomers formed by the process of my invention may be used for a host of different purposes, depending upon whether they are homopolymers, ordered polymers, or copolymers, their molecular weight, $T_g$, and related chemicals and physical properties.

Relatively high MW polymers in the range from about $\overline{Mn}$ 5000 to about 10,000 may be used with a conventional free radical initiator or simply thermally crosslinked while it being injection molded into pump housings and the like. The crosslinked polymer is an engineering plastic which has excellent solvent resistance quite unlike commercially available PAPE, for example the Udel[R] APS which is available in a $\overline{Mn}$ in the range from about 20,000 to about 50,000, but with comparable physical strength. Lower $\overline{Mn}$ difunctionalized macromers in the range from about $\overline{Mn}$ 1000 to about 5000 may be crosslinked in solution with any monomer or macromer with a reactive vinyl group to form polymers which may also be used for various forming and molding applications. Still another use for the difunctionalized macromers is for blending with polymers to improve the processability of the blend and to increase the $T_g$ of the finished product because of the generally high $T_g$ contributed by the di-$[DH(T)P]_n$ after crosslinking.

In a specific embodiment the invention is illustrated for a polyDHP oligomer formed with BPA and DCPS, by first forming a relatively low $\overline{Mn}$ aromatic polyether sulfone copolymer ("APS") of BPA and DCPS by the condensation of excess potassium salt of BPA with DCPS in anhydrous DMSO according to known methods, for example described by R. N. Johnson et al in *J. Polym. Sci, A*-1,5, 2375 (1967), inter alia. The yield is nearly 100% and the di-hydroxy oligomer obtained may be purified by precipitation from chloroform solution into methanol.

The $\overline{Mn}$ of the oligomer was determined by quantitatively esterifying the phenolic end groups and the degree of polymerization was determined by $^1$H-NMR spectra from the following relationships:

$$\overline{DP} + 1\,\frac{A_{CH3}/6}{A_{DNBC(9.22)}/6} \text{ for } DNBC \text{ esterified (60-MHz)}$$

and $$\overline{DP} + 1\,\frac{A_{CH3}/6}{A_{CBC(8.2)}/4} \text{ for CBC esterified (200-MHz)}$$

wherein DNBC=3,5-dinitrobenzoyl chloride, and, CBC=4-cyanobenzoyl chloride.

Measured $\overline{Mn}$ were in the range from about 1000 to about 5000. Values for specific BPA—DCPS oligomers are given in the following Table I.

| Sample identif. | BPA:DCPS mole ratio | $\overline{Mn}$ (theor.) | $\overline{Mn}$ (NMR) | Mi (GPC)* | Ev,ml (GPC)* | $T_g$ °C. |
|---|---|---|---|---|---|---|
| APS-1 | 2.00:1.0 | 1328 | 1210 | 1000 | 29.1 | 87 |
| APS-2 | 1.50:1.0 | 2212 | 2550 | 2350 | 28.1 | 135 |
| APS-3 | 1.33:1.0 | 3124 | 3050 | 3900 | 27.5 | 138 |
| APS-4 | 1.25:1.0 | 3982 | 3410 | 5400 | 27.0 | 148 |
| APS-5 | 1.20:1.0 | 4868 | 3875 | 5700 | 26.9 | 146 |

*each corresponds to the maximum of the GPC curve.

To obtain a yield greater than 50% it is essential that the di-$[DH(T)P]_n$ be prepared by reaction of the $[DH(T)P]_n$ with the HAR in the presence of a solubilizing amount of a PTC under aqueous alkaline conditions. By a "solubilizing amount" of PTC I refer to an amount sufficient to solubilize the alkali metal salt ("bisphenolate") of the $[DH(T)P]_n$ formed in the aqueous phase. By "aqueous alkaline conditions" I refer to a large excess of an aqueous solution of an alkali metal hydroxide containing from about 15% to about 75% by weight (% by wt), and preferably from about 30% to about 50% by wt of alkali metal hydroxide. Preferred alkali metal hydroxides are those of sodium and potassium. By "large excess" I refer to an excess based on the number of moles of OH groups originally present in the $[DH(T)P]_n$, preferably from about a two-fold (2 times) to a twenty-fold (20 times) excess.

Unlike most PTC reactions, where the reaction proceeds in the presence of a minor molar amount from about 1 mole percent (mol %) to about 50 mol % based on the moles of one of the reactants, under such conditions there quite unexpectedly is essentially no noticeable etherification which results in the addition of the HAR to the ends of the $[DH(T)P]_n$. However, when the concentration of PTC is increased to a major molar amount, there is more than 50 mol %, use an equimolar amount of PTC for a practical reaction rate for etherification. Esterification generally proceeds faster than esterification in a PTC reaction, and the concentration of PTC catalyst needed is generally less than 50 mol %, but the rates are better at a concentration in the range from a major molar amount to an equimolar amount.

By PTC, I refer to onium salts, macrocyclic polyethers (crown ethers), macrobicyclic polyethers (cryptands), and the like, most preferred being the onium salts of a Group VA element of the Periodic Table having certain structural limitations. The preferred salts have the formula $R_nY^+X^-$ where Y is chosen from N, P and S; R represents either different or identical monovalent organic radicals bonded to Y by covalent linkages; $X^-$ is a counterion; and n is an integer which may be 3 or 4. When Y is pentavalent, for example P or N, then N=4, and when Y is tetravalent, for example S, then n=3. In an analogous manner, onium salts having certain multivalent organic substituents may be useful in this invention. Examples include multivalent organic radicals that include Y in a ring, and those that are bonded to more than one Y.

More preferred onium salts for use in this invention have the formula $(R_aR_bR_cR_dY^+)X^-$ wherein Y is N or P, and $R_a$—$R_d$ are monovalent hydrocarbon radicals preferably selected from the group consisting of alkyl, alkenyl, aryl, alkaryl, aralkyl, and cycloalkyl moieties or radicals, optionally substituted with suitable heteroatom-containing functional groups. The total number of carbon atoms in $R_a$, $R_b$, $R_c$, and $R_d$ if the salt is quaternary, should be at least 10 and is preferaby in the range from about 15 to 40. No theoretical maximum number of carbon atoms for inclusion in the onium salts exists, although in general, about 70 carbon atoms represents the upper limit imposed by practical limitations. Since the liquid phases involved are aqueous and organic, the number of carbon atoms and structure of the onium salts are usually selected to impart to the salt the requisite solubility in the organic phase. The onium salt itself is nonreactive to all materials in the reaction mixture except the reactants themselves, and the addition of the HAR to the polyDH(T)P takes place in the organic phase.

Most preferred onium salts have Y=N, and the hydrocarbon radicals where $R_a$ is $C_2H_5$, and $R_b$, $R_c$, and $R_d$ are each selected from the group consisting of n-$C_4H_9$, n-$C_5H_{11}$; mixed $C_5H_{11}$; n-$C_6H_{13}$; mixed $C_6H_{13}$; $C_6H_5$; $C_6H_5CH_2$; n-$C_8H_{17}$; n-$C_{12}H_{25}$; n-$C_{18}H_{37}$; mixed $C_8$-$C_{10}$ alkyl; and the like. I prefer symmetrical PTCs, namely those in which $R_a$—$R_d$ are each the same.

Various counterions may be used, including $Cl^-$, $Br^-$, $I^-$, $F^-$, $HSO_4^-$ and the like. Most preferred is $HSO_4^-$. A commercially available and highly effective onium salt PTC is tetrabutylammonium hydrogen sulfate ("TBAH").

The reaction temperature and pressure conditions for etherifying the $[DH(T)P]_n$ with vinyl end groups, and particularly styryl end groups, or, for esterifying the oligomer, specifically with methacrylyl end groups, are not narrowly critical, most reactions occurring at ambient (atmospheric) pressure and above ice-bath temperature (0° C.) but below a temperature at which undesirable side reactions will occur, or above that which will deleteriously affect the structure of the oligomer. The pressure may range from about 1 to about 20 atms, and the precise temperature at which a particular reaction will proceed most favorably will depend upon the particular HAR chosen, the mol wt of the $[DH(T)P]_n$, the solvent medium, particularly if it is a reactive solvent, inter alia, as one might expect, and may be determined with a little trial and error, as one skilled in the art would expect to do. Most preferred for forming the di-$[DH(T)P]_n$ with styryl, (meth)acrylyl, or dialkoxyvinyl ether end groups is a temperature in the range from about 10° C. to about 150° C.

Similarly, the temperature and pressure reaction conditions for forming a di-$[DH(T)P]_n$ with ethynyl end groups is not critical, but in the general range conventionally used for bromination and, thereafter, dehydrobromination of the di-$[DH(T)P]_n$. Both bromination and dehydrobromination reactions are found to proceed quickly at ambient pressure and a temperature in the range from about 10° C. to about 100° C., again depending upon the solvent used, the particular APS used, especially with respect to its mol wt. Most preferred organic solvents for ethynylation of the DAPS are DMSO and THF.

The DAPS formed by reaction of an APS macromer with a HAR may be represented by the structure:

$R^e$—R—APS—R—$R^e$ (XIII)

wherein,

R represents O or S;

$R^e$ represents is a residuum containing a terminal carbon to carbon double bond at each end of the oligomer; and, APS represents the residuum of the APS oligomer.

The DAPS formed by reaction of a BPA(s)—DPS macromer with a HAR may be represented by the structure:

$R^e$—O—BPA(s)$\{$O—DPS(s)—O—BPA(s)$\}_n$O—$R^e$ and more fully, (XIV)

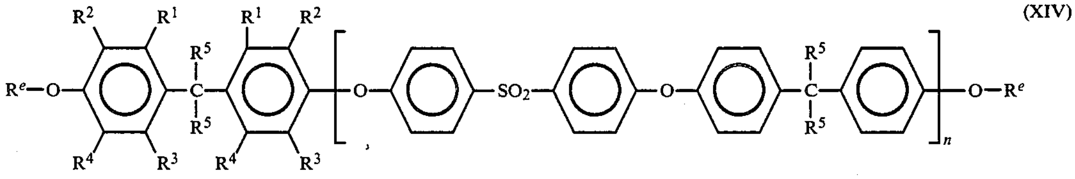

wherein, $R^e$ and the inert substituents $R^1$-$R^5$ have the same connotation as that set forth hereinbefore, and if present, would also be present in the repeating unit, but for convenience are not written hereabove; and, n represents an integer in the range from about 2 to about 100.

The APS formed by the reaction of a BTPA—DPS macromer with a HAR has the structure:

$R^e$—S—BTPA(s)—S—DPS(s)—S—BTPA(s)—$_n$-S—$R^e$ which is analogous to the difunctionalized BPA-DPS macromer hereabove.

Whether the oligomers are to be esterified or etherified, most preferred are oligomers which are linked DHPs, that is, the $R^s$ is a dihalogenated DHP, most preferred among which are those having a sulfone, carbonyl, silane or ether oxygen. Most preferred for esterification are oligomers to be terminated with (meth)acrylate groups. For example, when the oligomer has a linked PBA—DPS repeating unit, the methacrylate ester is represented by the formula:

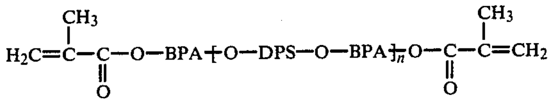

An ester of a BPA-diphenyl ketone ("DPK") oligomer is represented as:

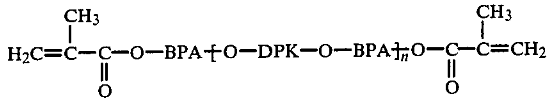

An ester of a BPA-diphenyl ether ("DPE") oligomer is represented as:

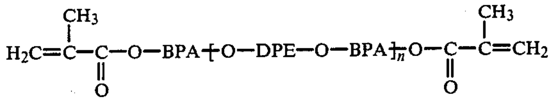

When the $R^s$ of the same as the DPH, for example when the oligomer is a homopolymer of DPE which may have inert substituents, the ester is represented as follows:

$$MA—O—DPE{+}O—DPE{+}_nO—MA$$

where MA represents the methacrylate group.

When the oligomers are to be etherified, most preferred are terminal VB groups, represented in the following etherified oligomers as "St" for styryl:

$$St—CH_2—O—BpA{+}O—DPS—O—BPA{+}_nO—CH_2—St$$

$$St—CH_2—O—BPA{+}O—DPK—O—BPA{+}_nO—CH_2—St$$

$$St—CH_2—O—BPA{+}O—DPE—O—BPA{+}_nO—CH_2—St$$

When the oligomer is a homopolymer of DPE, as hereinabove, and it is to be provided with terminal styryl groups, it is represented as follows:

$$St—CH_2—O—DPE{+}O—DPE{+}_nO—CH_2—St$$

The choice of solvent in which the reaction with the HAR is carried out will effect not only the rate at which the reaction occurs, but may also affect the structure of the polymer if the solvent reacts with the OH groups of the APS, as is the surprising case with numerous reactive solvents which are liquids at the temperature of the reaction in which the reactive solvent residue "$R^s$" links two BPA(S) moieties, as will be detailed more fully hereinafter.

The main criterion for choice of the solvent is its insolubility in the aqueous alkaline phase, because the solubilization of the APS-salt with the PTC (say TBAH) occurs quite readily in most organic phases, whether the APS-salt is precipitated, or whether it is formed in situ and is solubilized without actually being precipitated. Solvents such as DMSO and THF which are soluble in water, but are essentially insoluble in this aqueous alkaline phase, may be used. To tailor an APS to conform with theoretical expectations, it is most preferred to use an inert, that is non-reactive, solvent such as dichlorobenzene or other inert halogenated aromatic, aliphatic or cycloaliphatic liquids.

Precipitation of the APS-salt will occur when the excess aqueous alkali is added to a solution of the APS in the organic solvent. The salt so formed is then solubilized by the PTC and is taken up by the organic phase. When the HAR is added, reaction occurs and the APS is difunctionalized. This first mode of carrying out the difunctionalization is referred to as the "precipitation mode".

Precipitation of the APS-salt is avoided when the PTC is dissolved in the organic phase and added to the APS, and the HAR then added. Added last, is the aqueous alkali so that the APS-salt is formed in situ and the desired difunctionalization results without actual precipitation of the APS-salt. This second mode of carrying out the difunctionalization is referred to as the "in situ mode".

When the "$R^s$" is a dihaloalkane, the residue $R^s$ is alkenyl or alkylene. By "alkenyl" is meant the same as "alkylene", that is, a bivalent group derived by the removal of one H atom from two different carbon atoms of an alkane, but also includes methylene which, as an exception, is obtained by the removal of two H atoms from the same carbon atom. Examples of short chained alkylene substituents are methylene ($—CH_2—$), ethylene ($—CH_2—CH_2—$), 1,2-propylene($CH_3—CH—CH_2—$), 1,3-propylene ($—CH_2—CH_2—CH_2—$), butylene and the like.

When the reactive solvent is a dihalomethane, the halogens react with the —OH or —SH groups of the B(T)PA in the APS, or the alkali metal salt of the APS, linking the B(T)PA moieties together, with the alkenyl residue being lodged in the main body or 'backbone' structure of the polymer, as a repeating unit represented as follows:

$$B(T)PA(s)—DPS(s)—B(T)PA(s)—R^s—B(T)PA(s)—DPS(s)—B(T)PA(s)$$

which is termed 'dibisphenol A sulfone', or "DiB(T)PA(s)DPS(s)", wherein, $R^s$ represents the residue of the liquid reactive solvent after reaction with the APS which reaction results in the linking of two B(T)PA(s) moieties in the backbone. $R^s$ is preferably alkenyl having from 1 to about 10 carbon atoms, and aralkenyl having from 7 to about 17 carbon atoms. Preferred reactive solvents are selected from the group consisting of dihaloalkanes having from 1 to about 4 carbon atoms, most particularly dichloromethane, dihalcycloalkanes having from 3 to about 6 carbon atoms, most particularly 1,4-dichlorocyclohexane, and dihaloalkylbenzenes having from 7 to about 12 carbon atoms, most particularly $\alpha,\alpha$-dichlorotoluene.

In the particular instance where dichloromethane is the reactive solvent and the oligomer is BPAS, chain extension of the resulting backbone structure includes a repeating unit:

BPA—DPS—BPA—$CH_2$—BPA—DPS—BPA which is termed dibisphenol A sulfone methane or "Di(BPA)(DPS)M" for brevity.

The foregoing Di(BPA)(DPS)M may occur as repeating units in a polymer, or in a mixture with units of (BPA)(DPS), so that the DAPS will generally include a mixture of chains, some of which may be only Di(BPA)(DPS)M repeating units, some of which may be only (BPA)(DPS) repeating units, the rest being a mixture of Di(BPA)(DPS)M and (BPA)(DPS) units, according to the statistical distribution for the reaction conditions.

EXAMPLE 1

The following procedure illustrates the reaction of one of the APS macromers (APS-2) listed in Table I hereinabove, with chloromethylstyrene (ClMS) in the precipitation mode.

To a stirred solution of 6 g (0.0047 mole —OH) APS-2 in 30 ml $CH_2Cl_2$, 4 ml of a 50% aqueous solution of NaOH were added at room temperature. The sodium salt of APS-2 precipitated immediately. After the addition of 1.6 g (0.0047 moles) TBAH, the reaction mixture became homogeneous once more. The dropwise addition of 1 ml (0.007 mole) ClMS created a dark blue color in the reaction mixture. After 30 min of stirring at room temperature the reaction mixture turned to light green and shortly thereafter to yellow. That the reaction was complete at this point was confirmed by $^1$H-NMR analysis. To make sure the reaction was complete, the general procedure was to continue the reaction for an additional hour.

The reaction mixture is then diluted with 20 ml $CH_2Cl_2$ and the organic phase was separated. The separated phase was washed with water and polymer precipitated in methanol acidified with a few drops of HCl. For analytical purposes a sample was once again precipitated into methanol from chloroform solution without affecting the concentration of the polymer chain ends, which was confirmed upon analysis. Essentially 100% yield of the $\alpha,\omega$-di(styrene) APS is obtained.

In the following Table II which is a tabulation of some physical properties of particular styryl-terminated BPA-DPS oligomers, the APS oligomers prepared in the precipitation mode are designated "A(ppt)".

In an analogous manner, styryl terminated BTPA-DPS oligomers are formed in the precipitation mode and may be similarly thermally cross-linked.

Also in an analogous manner, (meth)acryloyl chloride yields (meth)acrylyl chain ends, CEVE yields an APS with ethoxy vinylether chain ends on both BPA-DPS and BTPA DPS oligomers which may then be cross-linked, though not thermally. Thus, it is evident that in general, the HAR is condensed on each end of the BPA(s)-DPS(s) or BTPT(s)-DPS(s) oligomers with the elimination of HCl most of which ends up in the aqueous phase

EXAMPLE 2

The procedure of example 1 may be varied to avoid precipitating the Na-salt by adding the TBAH dissolved in $CH_2Cl_2$ to the APS-2, then adding two mol equivs of ClMS. To this mixture is added a molar excess of 50% aqueous NaOH. The reaction mixture was always homogeneous. The bisphenolate of the APS is not in contact with the $CH_2Cl_2$ in the absence of ClMS. The reaction proceeds in the in situ mode, at room temperature rather more quickly than in the precipitation mode.

In each of the foregoing examples, a large molar excess of aqueous NaOH is used, generally about ten times greater (referred to herein as a "10-fold excess") than the mol equivs of —OH groups of the APS. It will be recognized that, both relative to the addition of one mol equiv of TBAH and a 10-fold excess of NaOH, the actual weight of TBAH used is small, because the weight equivalent of the APS is relatively large.

In the following Table II the polysulfone oligomers prepared in the in situ mode are designated "B (in situ)".

EXAMPLE 3

The foregoing examples 1 and 2 were carried out in $CH_2Cl_2$ and produce oligomers some of which are chain extended and have different physical characteristics compared to those produced in chlorobenzene ("ClBz"). The foregoing procedures were repeated except that ClBz was used as the solvent instead of $CH_2Cl_2$. Oligomers difunctionalized in ClBz are listed in the following Table II as samples designated "C (ClBz)".

TABLE II

Thermal Characterization (DSC) of APS and $\alpha,\omega$-di(styrene)APS Oligomers

| APS | | | $\alpha,\omega$-di(styrene)APS | | | | | | | |
|---|---|---|---|---|---|---|---|---|---|---|
| APS | $\overline{Mn}$ (NMR) | $T_g{}^\circ$ (°C.) | Sample | $T_g{}^i$ (°C.) | $T_S$ (°C.) | $T_E$ (°C.) | $T_S$–$T_g{}^i$ (°C.) | $T_g{}^f$ (°C.) | $T_g{}^f$–$T_g{}^i$ (°C.) | Rxn time to comp @ 257° C. |
| APS-5 (a) | 1210 | 87 | A (ppt) | 77 (a) | 117 | 257 | 40 | 172 (b) | 95 | 0.5 hr |
| | | | B (in situ) | 73 | 114 | 257 | 41 | 197 | 124 | 1.0 hr |
| | | | C (ClBz) | 56 | 139 | 257 | 83 | 206 | 150 | 2.5 hr |
| APS 1 | 2550 | 135 | A (ppt) | 125 | 166 | 257 | 41 | 184 | 59 | 25 min |
| | | | B (in situ) | 115 | 196 | 257 | 71 | 191 | 76 | 15 min |
| | | | C (ClBz) | 107 | 195 | 257 | 88 | 192 | 85 | 15 min |
| APS-2 | 3070 | 138 | A (ppt) | 137 | 174 | 257 | 34 | 180 | 43 | 15 min |
| | | | B (in situ) | 132 | 193 | 257 | 61 | 185 | 53 | 0.5 hr |
| | | | C (ClBz) | 117 | 166 | 257 | 49 | 189 | 72 | 20 min |
| APS-4 | 3890 | 146 | A (ppt) | 136 | 173 | 257 | 37 | 170 | 34 | 5 min |
| | | | B (in situ) | 138 | 196 | 257 | 58 | 178 | 40 | 1.66 (c) hr |

TABLE II-continued

Thermal Characterization (DSC) of APS and α,ω-di(styrene)APS Oligomers

| APS | | | α,ω-di(styrene)APS | | | | | | | |
|---|---|---|---|---|---|---|---|---|---|---|
| APS | $\overline{Mn}$ (NMR) | $T_g^°$ (°C.) | Sample | $T_g^i$ (°C.) | $T_S$ (°C.) | $T_E$ (°C.) | $T_S$-$T_g^i$ (°C.) | $T_g^f$ (°C.) | $T_g^f$-$T_g^i$ (°C.) | Rxn time to comp @ 257° C. |
| | | | C (ClBz) | 126 | 176 | 257 | 50 | 180 | 54 | 20 min |

$T_g^°$ = $T_g$ of APS; $T_g^i$ = $T_g$ of α,ω-di(styrene)APS; $T_g^f$ = final $T_g$ of thermally cured α,ω-di(styrene)APS, i.e. constant value which does not increase by subsequent curing at 257° C.; $T_S$ = temperature at which the exothermal process starts; $T_E$ = temperature at which the exothermal process ends.

(a) APS-5 shows two exotherms, others typically show only one.

(b) some decomposition occurs when maintained at 257° C.; $T_g$ is max observed.

(c) does not reflect time necessary to complete reaction.

(d) this $T_g$ is subject to aging effects.

As will be evident from the properties listed in Table II all the reactions were exothermic, and all were terminated at 257° C. The difference between $T_S$ and $T_g^i$ for each APS after di(styrenation) is termed the processing window. The range over which the exothermal process occurs is from $T_S$ (when it starts) to $T_E$ (when it ends). The difference between $T_g^f$ and $T_g^i$ is a measure of the improvement in $T_g$ after crosslinking. It is apparent that, most remarkably, the $T_g^f$ of the crosslinked polymer is much higher than the uncrosslinked oligomer in every case, and in the samples prepared in ClBz, the $T_g^f$ is nearly triple the $T_g^i$. As will also be evident, the remarkable increase in $T_g$ upon crosslinking begins to wane as the mol wt of the APS oligomer increases.

The DAPs with vinyl end groups may be converted to an APS oligomer with ethynyl end groups (referred to as 'ethynylation' of the DAPS), by first brominating the DAPS, preferably a di(styrenated)APS, and thereafter, dehydrobrominating the brominated DAPS. The ethynylated DAPS has the structure:

$$R^{e'}—R—APS—R—R^{e'} \qquad (XV)$$

wherein,

R represents O or S;

$R^{e'}$ represents is a residuum containing a terminal carbon to carbon triple bond at each end of the oligomer; and, APS represents the residuum of the APS oligomer.

The ethynylated DAPS formed from a BPA(s)-DPS macromer is represented by the structure:

$$R^{e'}\text{-O-BPA(s)}+\text{O—DPS(s)'O—BPA(s)}+_n\text{O—}R^{e'}$$

and more fully,

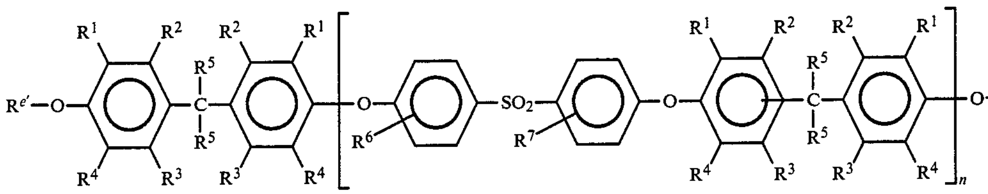

when the α,ω-di(styrene)APS is ethynylated, $R^{3'}$ represents

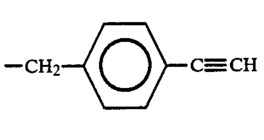

and $R_6$ and $R_7$ are inert substituents In the foregoing structure of the ethynylated oligomer, APS represents a poly(thio)ether sulfone formed from a B(T)PAS(s) having the structure (I) or (II), and a DHPS having the structure (III);

$R^{e'}$, n, $R^1$, $R^2$, $R^3$, $R^4$, $R^5$, $R^6$ and $R^7$ have the same connotation as that set forth hereinabove.

The ethynylated DAPS formed from a BTPA-DPS macromer has the structure:

$$R^{e'}\text{—S—BTPA(s)}+\text{S—DPS(s)—S—BTPA(s)}+_n\text{S—}R^{e'}$$

which is analogous to the difunctionalized BPA-DPS macromer hereabove.

EXAMPLE 4

The following procedure illustrates the conversion of the particular di-styrenated APS-2 made hereinabove in example 1 to α,ω-di(ethynylphenyl)APS-2 in two steps:

In the first step, a stirred solution of 4 g (0.0032 mole styrene) of the di(styrene)APS-2 (obtained hereinbefore) in 30 ml $CH_2Cl_2$ was titrated at room temperature with a 1M solution of $Br_2$ in $CH_2Cl_2$. At the end of the titration a few more drops were added until an orange color persisted. A total of 4 ml (0.004 mole $Br_2$) solution of 1M bromine in $CH_2Cl_2$ were used. After stirring for 30 min at room temperature, the reaction mixture was precipitated into slightly acidified methanol, filtered, washed with methanol and dried under vacuum at room temperature. The product obtained was confirmed by analysis to be α,ω-di(dibromostyrene)APS-2.

In the second step, to a stirred solution of 3 g (0.0024 mole dibromostyrene) of the di-bromo product obtained hereinabove in 30 ml DMSO or THF was added a solution of 0.8 g (0.072 mole) potassium tert-butoxide ("K-t-Bu") in 5 ml DMSO or THF. KBr started to precipitate during the early stages of the addition of K-t-Bu solution. Samples were withdrawn periodically and the conversion was monitored by $^1$H-NMR analysis. Usually after 4 hr of reaction, the dehydrobromination was complete both in DMSO as well as in THF. The solution was filtered and polymer is precipitated in acidified methanol, then filtered and dried. To remove all traces of organic impurities, the obtained polymer was dissolved in $CH_2Cl_2$, filtered and precipitated again in methanol, and then filtered and dried at room temperature under vacuum.

The sequences of reactions, starting with the APS, is given below:

(XVI)

(XVII)

(XVIII)

(XIX)

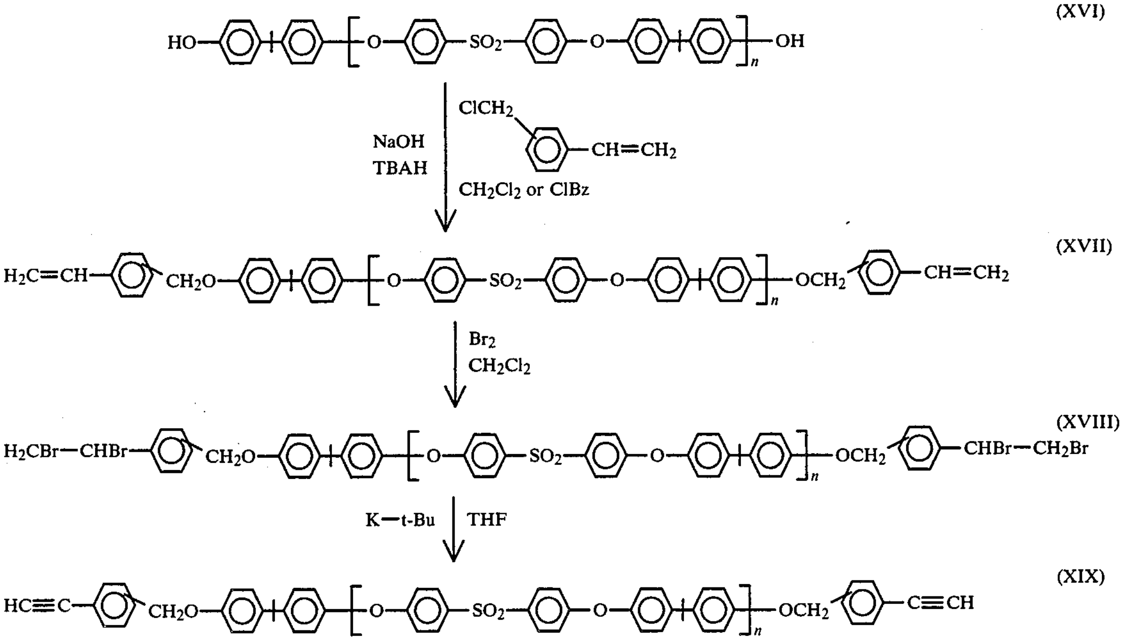

MAIN STEPS IN THE SYNTHESIS OF AROMATIC POLYETHER SULFONES CONTAINING STYRENE AMD ETHYNYLPHENYL CHAIN ENDS

It will be evident from the foregoing that the di(ethynylphenyl)APS oligomers will easily be thermally cured, which is the dominant characteristic of acetylene terminated oligomers. What is so useful is that the di(ethynylphenyl)APS oligomers, like the di(styrenated)APS, and to a lesser extent, the di(meth)acrylyl oligomers, are thermally cured with good speed. If desired, they may also be cured with conventional initiators such as acetyl peroxide, the heavy metal polymerization initiators, and the like, as is well known in the art.

EXAMPLE 5

A PPO oligomer having a $\overline{Mn}$of about 2000 was prepared according to the procedure disclsoed in an article title "Poly(2,6-dimethyl1,4-phenylene oxide) with Narrow Molecular Weight Distribution via Methylene Chloride Complexation" by Dwain M. White, *Macromolecules,* Vol 12 No. 5, September–October 1979, pg 1008–1009; and the oligomer was used to prepare a PPO oligomer with an —OH group at each chain end as described in the article by White, D. M. in *Jour. of Poly. Sci.,* Polym. Chem. Edition, supra. The oligomer obtained ($\overline{Mn}$ about 4000) in benzene was stirred at room temperature with an excess of 50% aqueous solution of NaOH followed by addition to TBAH in a major amount based on the moles of OH, and CIMS. After stirring, the reaction is found to be completed, and the styryl-terminated PPO oligomer is recovered. The St-terminated oligomer is found to be thermally crosslinkable to yield a crosslinked polymer.

EXAMPLE 6

The following procedure illustrates the esterification of the APS oligomers (APS-2) without the use of a PTC:

A solution of methacryloyl chloride (molar excess) in $CH_2Cl_2$ was added slowly to a stirred solution of the APS-2, dimethylaminopyridine, and triethylamine cooled in an ice bath. After stirring for a couple of hours the temperature was raised to room temperature and stirring continued. The reaction mixture was washed with dilute HCl solution, then water and the product dried. Analysis indicates that all OH groups are esterified.

EXAMPLE 7

The esterification reaction with methacryloyl chloride is carried out in the presence of a PTC to provide much faster reaction, by first forming the sodium salt by addition of an excess of 50% aqueous solution of NaOH to a stirred solution of the APS-2 in $CH_2Cl_2$ at room temperature. The reaction mixture is made homogeneous by addition of an excess of TBAH and a solution of methacryloyl chloride in $CH_2Cl_2$ (stoichiometric excess) was added. The reaction mixture is worked up and found to yield, substantially quantitatively, an APS oligomer which is terminated at each end with a methacrylyl group.

In an analogous manner other PAPE oligomers may be esterified.

This discovery, illustrated by the foregoing specific examples, now makes it feasible to synthesize a vast array of PAPE oligomers which can be either (i) esterified with numerous haloacyl reactants, or (ii) etherified with readily available haloalkyl reactants.

Most preferred are the di(styrenated) macromers which may be used, either by themselves, or in conjunction with compatible or incompatible polymers, to improve the chemical and physical characteristics of the resulting polymers. By "compatible polymer" I refer to one in a blend of polymers in which one polymer is substantially miscible in the other even if plural phases are found to exist in the blend. The di(styrenated) macromers may be di(ethynylated) and again used, either by themselves, or in conjunction with compatible or incompatible polymers, to improve the chemical and physical properties of the resulting polymers.

From the foregoing it will be evident that the essential manipulative step which permits difunctionalization of the APS, and specifically di(styrenation) which produces an oligomer having a terminal functional group $R^3$ represented by the structure:

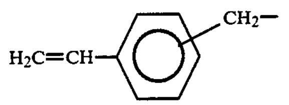

is the use of a major molar equiv amount of PTC which results in an economic yield and a clean and fast reaction. This is particularly true for etherification of the APS which would not otherwise be VB-terminated economically. It is also true for esterification where speed of reaction is desired.

As stated hereinabove, the rate of reaction will depend, inter alia, upon the HAR and the reactant, or, reactive solvent which is chosen to provide the residue $R^s$. It will also be evident that the most desirable oligomers are those formed with a DPS or DPK as an essential moiety. For example, diphenyl sulfide and dichlorophenyl sulfone provide useful oligomers.

Though VB end groups are most preferred, any HAR with a comparably reactive halogen atom at one end and a vinyl group at the other, will provide excellent reaction rates and yields. Similarly, though methacryloyl chloride is the most preferred HAR for esterification, numerous available terminally monohalogenated α,ω-unsaturated olefins may be used, most preferably if they include an allylic halide group. For example, 1-chloro-2-hexene is an HAR with desirable allylic halide characteristics. Also useful, but providing a slower reaction rate, is 6-chloro-1-hexene, which is not an allylic halide.

For convenient reference, the following is a list of the acronyms used in the foregoing specification:

APS: α,ω-di(phenol)aromatic poly(thio)ether sulfone
BPA: bisphenol A
BTPA: bisthiophenol A
B(T)PA: BPA and/or BTPA
BPAS: bisphenol A sulfone
BTPAS: bisthiophenol A sulfone
B(T)PAS: bisphenol A sulfone and/or bisthiophenol A sulfone
BPA(s): BPA with inert substituents
BTPA(s): bisthiophenol A with inert substituents
B(T)PA(s): BPA(s) or BTPA(s)
CIMS: chloromethylstyrene
DAPS: difunctionalized APS
DCPS: dichlorophenyl sulfone
DHP: dihydric phenol
DHPS: dihalophenyl sulfone
DHTP: dihydric thiophenol
DH(T)P: dihydric phenol and/or dihydric thiophenol
Di-[DHP]$_n$: difunctionalized poly[dihydric phenol]
DMF: dimethyl formamide
DMSO: dimethyl sulfoxide
DPE: diphenyl ether
DPK: diphenyl ketone
DPS: diphenyl sulfone
HAR: haloalkyl reactant or haloacyl reactant
K-t-Bu: potassium-tert-butoxide
PAPE: polyarylene polyether
Ph: phenol
PPO: polyphenylene oxide with inert substituents
PTC: phase transfer catalyst, phase transfer catalytic
TPh: thiophenol
$T_g$: glass transition temperature.

I claim:

1. A difunctionalized substantially linear crosslinkable thermoplastic polyarylene polyether oligomer, or polyarylene polythioether (PAPE) oligomer represented by the formula:

$R^e$—R—["PAPE"]—R—$R^e$ wherein,

R represents O or S in an ether linkage with $R^e$;

$R^e$ represents a residuum containing a terminal carbon to carbon double bond at each end of the oligomer; and, "PAPE" represents the residuum of at least one dihydric phenol optionally substituted with inert substituents, so that said crosslinkable oligomer is represented by the formula:

$R^e$—R—["DH(T)P"]$_n$—R—$R^e$ wherein, n is an integer in the range from 2 to about 100;

["DH(T)P"] is the residuum of dihydric phenol or dihydric thiophenol moieties linked through a linking residue $R^s$ so as to form a repeating unit

[DH(T)P—$R^s$]

wherein

DH(T)P is a residuum of a structure selected from

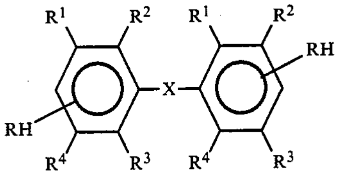

and

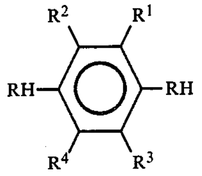

X represents a bond between aromatic carbon atoms or a divalent connecting radical selected from the group consisting of C=O, —O—, —S—, —S—S—, —$SO_2$—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups;

$R^1$, $R^2$, $R^3$, and $R^4$ are inert substituents, which if present on any phenyl ring, may each be the same or different and represent halogen, particularly chlorine or bromine; $NO_2$; alkyl having from 1 to about 18 carbon atoms, without regard for the spatial configuration such as normal, iso or tertiary; alkoxy having from 1 to about 18 carbon atoms; and, hydrogen; and, $R^s$ represents the residuum of a reactive linking group selected from the group consisting of the same or another [DH(T)P]; a α-dihaloalkane having from 1 to about 18 carbon atoms; phosgene; alkyl and aryl diacid halides including dihaloaryl having six ring carbon atoms; dihalophenyl phosphonate; bis(haloalkoxy)alkane having from 3 to about 20 carbon atoms; and, dihalocycloalkanes having from 3 to 7 ring carbon atoms; so that the molecular weight $\overline{Mn}$ of said crosslinkable oligomer is in the range from about 1000 to about 10,000.

2. The PAPE oligomer of claim 1 wherein R represents O.

3. The PAPE oligomer of claim 1 wherein R represents S.

4. The PAPE oligomer of claim 1 wherein said $R^e$ is a residuum which includes a functional group selected from the group consisting of styrylmethylene, acrylyl, methacrylyl, and alkoxyvinyl ether having from 1 to about 18 carbon atoms.

5. The PAPE oligomer of claim 1 wherein DH(T)P and $R^s$ are each residua of a dihydric phenol ("DHP") selected from the group consisting of a dihydric polynuclear phenol and a mononuclear polyhydric phenol.

6. The PAPE oligomer of claim 5 wherein said polynuclear DHP is selected from the group consisting of 2,2-bis(4-hydroxyphenyl)propane; 2,2-bis(4-hydroxyphenyl)silane; diphenyl sulfone; diphenyl sulfide; diphenyl ketone and diphenyl ether; and said mononuclear DHP is a 1,4-dihydroxy benzene.

7. The PAPE oligomer of claim 6 wherein the combinations of the following DHPs are present as residua in the repeating unit:

(i) 2,2-bis(4-hydroxyphenyl)propane and diphenyl sulfone;
(ii) 2,2-bis(4-hydroxyphenyl)propane and diphenyl ketone;
(iii) 2,2-bis(4-hydroxyphenyl)propane and diphenyl ether;
(iv) diphenyl sulfone and diphenyl ketone;
(v) diphenyl ketone and diphenyl ether;
(vi) diphenyl sulfone and diphenyl ether;
(vii) diphenyl sulfone and 1,4-dihydroxy benzene;
(viii) diphenyl sulfide and diphenyl sulfone;
(ix) 2,2-bis(4-hydroxyphenyl)propane, diphenyl sulfone and 1,4-dihydroxy benzene; and
(x) diphenyl sulfone and 1,4-dihydroxy benzene.

8. The PAPE oligomer of claim 5 wherein said DHP is the residuum of an oligomer of a dialkyl phenol and the $R^s$ is the residuum of an alkyl-substituted 1,4-dihydroxy benzene.

9. The PAPE oligomer of claim 1 wherein said "PAPE" is the residuum of an oligomer of polyphenylene oxide having a mol wt in the range from 1000 to about 10,000 and the O ether atom of one phenyl ring is connected to the phenyl ring of the next succeeding phenyl ring in said "PAPE".

10. The PAPE oligomer of claim 7 wherein $R^s$ is a residuum selected from the group consisting of alkenyl having from 1 to about 20 carbon atoms, dihalophenyl phosphonate, and aralkenyl having from 7 to about 27 carbon atoms.

11. The PAPE oligomer of claim 1 wherein said [DH(T)P] is chain extended with the residuum $R^s$ of said reactive linking group so that said crosslinkable oligomer is represented by the formula:

$$R^e-R-[[DH(T)P-R^s]_n[DH(T)P]-R-R^e$$

wherein $R^s$ represents the residuum of a reactant, or, reactive solvent, which residuum links two [DH(T)P] moieties which may be the same or different.

12. The PAPE oligomer of claim 6 wherein one said dihydric phenol is 4,4'-isopropylidenediphenol, and another dihydric phenol is a dihalophenylsulfone (DHPS) having the structure:

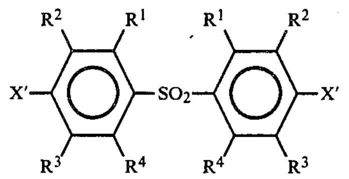

wherein,

X' represents halogen selected from the group consisting of fluorine, chlorine, bromine and iodine; and, $R^1$–$R^4$ are inert substituents, any of which if present on remaining positions on each ring, may each be the same or different and represent alkyl having from 1 to about 18 carbon atoms, without regard for the sptaial configuration such as normal, iso or tertiary; alkoxy having from 1 to about 18 carbon atoms; nitro ($NO_2$) and, hydrogen.

13. A difunctionalized substantially linear crosslinkable thermoplastic polyarylene polyether oligomer, or polyarylene polythioether oligomer (PAPE) represented by the formula:

$$R^{e'}-R-[\text{"PAPE"}]-R-R^{e'}$$

wherein,

R represents O or S in an ester or ether linkage with $R^{e'}$;

$R^{e'}$ represents is a residuum containing a terminal carbon to carbon triple bond at each end of the oligomer; and, "PAPE" represents the residuum of the PAPE oligomer.

14. The PAPE oligomer of claim 13 wherein "PAPE" represents the residuum of at least one dihydric phenol optionally substituted with inert substituents, so that said PAPE oligomer is represented by the formula:

$$R^{e'}-R-[\text{"DH(T)P"}]_n-R-R^{e'}$$

wherein, n is an integer in the range from 2 to 100;

R, and $R^{e'}$ have the same connotation as hereinbefore; and,

["DH(T)P"] is the residuum of dihydric phenol or dihydric thiophenol moieties linked through a linking residue $R^s$ so as to form a repeating unit $$[DH(T)P-R^s]$$

wherein

DH(T)P is a residuum having a structure selected from

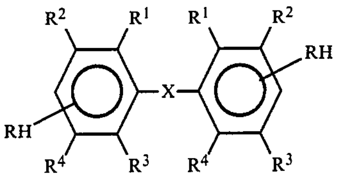

and

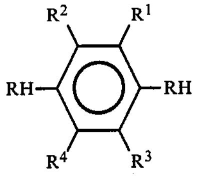

X represents a bond between aromatic carbon atoms or a divalent connecting radical selected from the group consisting of C═O, —O—, —S—, —S—S—, —$SO_2$—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups;

$R^1$, $R^2$, $R^3$, and $R^4$ are inert substituents, which if present on any phenyl ring, may each be the same or different and represent halogen, particularly chlorine or bromine; $NO_2$; alkyl having from 1 to about 18 carbon atoms, without regard for the spatial configuration such as normal, iso or tertiary; alkoxy having from 1 to about 18 carbon atoms; and, hydrogen; and, $R^5$ represents the residuum of a reactive linking group selected from the group consisting of the same or another [DH(T)P]; a α,ω-dihaloalkane having from 1 to about 18 carbon atoms; phosgene; alkyl and aryl diacid halides including dihaloaryl having six ring carbon atoms; dihalophenyl phosphonate; bis(-haloalkoxy)alkane having from 3 to about 20 carbon atoms; and, dihalocycloalkanes having from 3 to 7 ring carbon atoms;

so that the molecular weight $\overline{Mn}$ of said crosslinkable oligomer is in the range from about 1000 to about 10,000.

15. The PAPE oligomer of claim 14 wherein R represents O.

16. The PAPE oligomer of claim 14 wherein R represents S.

17. The PAPE oligomer of claim 14 wherein $R^{e'}$ includes an ethynylphenyl group.

18. The PAPE oligomer of claim 14 wherein DH(T)P and $R^5$ are each residua of a dihydric phenol ("DHP") selected from the group consisting of a dihydric polynuclear phenol and a mononuclear polyhydric phenol.

19. The PAPE oligomer of claim 18 wherein said polynuclear DHP is selected from the group consisting of 2,2-bis(4-hydroxyphenyl)propane; 2,2-bis(4-hydroxyphenyl) silane; diphenyl sulfone; diphenyl sulfide; diphenyl ketone and diphenyl ether; and said mononuclear DHP is a 1,4-dihydroxy benzene.

20. The PAPE oligomer of claim 18 wherein the combinations of the following DHPs are present as residua in the repeating unit:

(i) 2,2-bis(4-hydroxyphenyl)propane and diphenyl sulfone;

(ii) 2,2-bis(4-hydroxyphenyl)propane and diphenyl ketone;

(iii) 2,2-bis(4-hydroxyphenyl)propane and diphenyl ether;

(iv) diphenyl sulfone and diphenyl ketone;

(v) diphenyl ketone and diphenyl ether;

(vi) diphenyl sulfone and diphenyl ether;

(vii) diphenyl sulfone and 1,4-dihydroxy benzene;

(viii) diphenyl sulfide and diphenyl sulfone;

(ix) 2,2-bis(4-hydroxyphenyl)propane, diphenyl sulfone and 1,4-dihydroxy benzene; and, (x) diphenyl sulfone and 1,4-dihydroxy benzene.

21. The PAPE oligomer of claim 20 wherein $R^5$ also includes a reactant selected from the group consisting of phosgene; dichloromethane; and, dihalophenyl phosphonate.

22. A substantially linear thermoplastic thermally crosslinkable aromatic polyether sulfone ("APS") oligomer having alternating bisphenol A "BPA(s)" and diphenyl sulfone "DPS(s)" residua, said oligomer being terminated with ethynylphenyl "EtPh" units, optionally with each of said BPA(s), DPS(s), and EtPh units having substituents, represented by the formula:

EtPh—$CH_2$—O—BPA(s)$[$O—DPS(s)—O—BPA(s)$]_n$O—$CH_2$—EtPh and the structure:

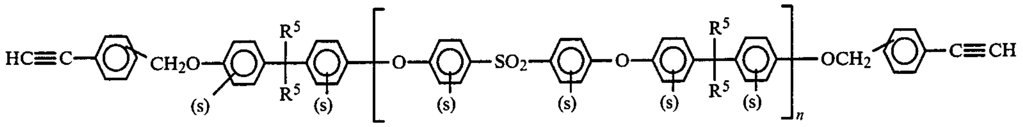

wherein, (s) represents H or $R^1$, $R^2$, $R^3$ or $R^4$;

$R^1$, $R^2$, $R^3$ and $R^4$ are inert substituents, any of which, if present on any phenyl ring, and $R^5$, may each be the same or different, and are selected from the group consisting of halogen, hydrogen, alkyl having from 1 to about 18 carbon atoms, and alkoxy having from 1 to about 18 carbon atoms, said alkyl and alkoxy being each chosen without regard for the spatial configuration of the carbon atoms; and, n represents an integer in the range from about 2 to about 10.

23. The APS oligomer of claim 22 wherein said $R^5$ are each methyl, and the remaining substituents are each hydrogen; and, said $\overline{Mn}$ is in the range from about 1000 to about 5000.

* * * * *

UNITED STATES PATENT AND TRADEMARK OFFICE
CERTIFICATE OF CORRECTION

PATENT NO. : 4,701,514 Page 1 of 2

DATED : October 20, 1987

INVENTOR(S) : Virgil Percec

It is certified that error appears in the above-identified patent and that said Letters Patent are hereby corrected as shown below:

Column 5, line 17, "α,ω-unsaturated" should read ---α,β-unsaturated---.

Column 15, line 1, "there" should be ---that---.

Column 15, line 4, "esterification" should read ---etherification---.

Column 16, formula at bottom of page, the brackets are missing.

Column 17, line 36, "of" should read ---is---.

Column 17, line 48, in formula, "BpA" should be all capital letters.

Column 20, line 16, "BTPT" should read ---BTPA---.

Column 20, line 18, there should be a period at the end of the sentence.

UNITED STATES PATENT AND TRADEMARK OFFICE
CERTIFICATE OF CORRECTION

PATENT NO. : 4,701,514

DATED : October 20, 1987

INVENTOR(S) : Virgil Percec

It is certified that error appears in the above-identified patent and that said Letters Patent is hereby corrected as shown below:

Column 23, line 32, insert ---readily--- after "will".

Column 25, line 7, "$R^3$" should read ---$R^e$---.

Signed and Sealed this

Third Day of May, 1988

*Attest:*

DONALD J. QUIGG

*Attesting Officer* *Commissioner of Patents and Trademarks*